Patented Oct. 5, 1954

2,691,109

UNITED STATES PATENT OFFICE 2,691,109

LOGGING OIL WELLS

George G. Bernard, Crystal Lake, Ill., assignor to The Pure Oil Company, Chicago, Ill., a corporation of Ohio No Drawing. Application December 31, 1951,
Serial No. 264,356

22 Claims. (Cl. 250—83)

1

This invention relates to a method of measuring the cation exchange capacity of clay materials. In a more specific aspect, this invention relates to a method of logging a bore hole by measuring the cation exchange capacity of the clay containing formations which form the walls of the bore hole. In a still more specific aspect, this invention relates to a method of logging a bore hole by measuring the gamma-radioactivity of the formations which form the walls of the bore hole, which gamma-radioactivity is induced by cation exchange between a cation exchange material, having a radioelement in its positively charged ion, and the naturally occurring clay components of the formations.

In the continual search for petroleum bearing formations and optimum means for extracting the petroleum oils and gases from these formations, it is essential that as much information as possible concerning the nature of the strata lying beneath the surface of the earth be available to the geologist or engineer investigating the characteristics of the strata traversed by a bore hole. One of the most perplexing problems confronting the investigator in his studies of subsurface formations is the necessity of recognizing the same geological formation in a number of related wells in a given area. In order to thus correlate these geological formations from well to well and obtain a true picture of the contour of each individual formation traversed by the bore holes, accurate data delineating one formation from another and recognizing the same formation in each well, regardless of extraneous conditions, must be available. In areas where secondary recovery is contemplated as a means of extracting additional quantities of petroleum from the formations, it is often desirable to know the nature of the formation to be treated in order to obtain optimum results from the operation. Knowledge of the nature of a particular formation is also of value in cases in which the permeability of the formation is to be increased by subjecting the formation to the action of highly reactive chemicals such as strong acids.

Much of the information necessary for a proper evaluation of the characteristics of subsurface strata is now supplied by the well log, produced by observing certain properties, physical, chemical, or the like, of the various strata forming the wall of the bore hole and plotting the observed property against depth to produce a graph showing the depth of the formation characterized by a given value of the observed property. However, there is much valuable information regarding the nature of subsurface strata which known methods of logging do not supply, the results obtained by these methods are often obscured by extraneous conditions brought into play by the drilling methods utilized, and the data produced by conventional logging methods is often indistinct and incapable of accurate interpretation even by the most proficient observer.

One of the better known and most widely used logging tests, commonly referred to as the "Schlumberger Test," utilizes differences in the electrical specific resistivity of formations as a criterion of differences in strata traversed by a bore hole. By comparing logs of specific resistivity obtained from a number of wells in a given area it is possible to map the general contour of the strata with a fair degree of accuracy. However, the specific resistivity log makes little distinction between one shale and another and is of very little value when used in a shale formation. In addition, the specific resistivity log is restricted almost exclusively to correlating strata of neighboring wells and gives little information as to the nature of the strata tested. It is also well known that specific resistivity measurements are often affected by factors other than the resistivity of the strata, such as the drilling fluid used in the completion of the well.

A more recently developed test which has been gaining popularity measures the naturally existing gamma-radioactivity of the formations traversed by a bore hole. Based on differences in the natural gamma-radioactivity of sandstone or limestone and shale, this logging method is also useful for correlating strata from well to well. Unlike specific resistivity, the gamma-radioactivity of a formation is unaffected by the type of drilling fluid used and other factors which are known to affect specific resistivity measurements. However, this log distinguishes shale from limestone or sandstone but does not make a distinction between the limestone and the sandstone, and the investigator must resort to other information or another type of log to distinguish between these two types of formations. The gamma-radioactivity log does distinguish some types of shales from other types, but this distinction is extremely small and not too reliable. This is readily apparent from the fact that the natural gamma-radioactivity of any formation is extremely small, and highly sensitive instruments are needed in order to make any distinction at all among the strata tested. As is the case with the specific resistivity log the gamma-radioactivity log does not supply information as to the nature of a formation which will be useful in secondary recovery and acidizing operations.

It is therefore an object of this invention to provide a method of measuring the cation exchange capacity of clay materials. Another object of this invention is to provide a method of measuring the cation exchange capacity of formations which form the walls of a bore hole.

Another object of this invention is to provide a method of logging bore holes. Still another object of this invention is to provide a method of logging a bore hole which is highly sensitive to changes in subsurface formations and which is unaffected by materials used in completing the well. A further object of this invention is to provide a method of logging a bore hole which will supply information useful in correlating strata from well to well. A still further object of this invention is to provide a method of logging a bore hole which will supply valuable information concerning the nature of the strata forming the walls of the bore hole. Another and further object of this invention is to provide a method of logging a bore hole which will supply information concerning the nature of the strata forming the walls of the bore hole which will be of value in selecting optimum methods of secondary recovery and chemical treatment of producing formations. Other and further objects of this invention will be apparent from the following description of my invention.

In accordance with my invention, it has been found that the above objects can be accomplished by contacting a clay material with a cation exchange material, having a radioelement in its positively charged ion, and measuring the amount of positively charged ion adsorbed from the cation exchange material by the clay material. It has further been found that the amount of positively charged ion adsorbed by the clay material is directly proportional to the gamma-radioactivity of the clay material. Therefore, the cation exchange capacity of the clay material can be measured by measuring the gamma-radioactivity of the clay material or by directly determining the amount of positively charged ion adsorbed by the clay material. A log of a bore hole is produced by correlating the measured values of gamma-radioactivity with the depth at which the formations being investigated are found in the bore hole.

Cation exchange capacity, as used in this specification and the appended claims, denotes that capacity of a clay material, measured in milliequivalents per 100 grams of clay, which enables the clay to give up certain positively charged atoms or radicals and in turn adsorb other positively charged atoms or radicals from among the elements and compounds existing in its environment. By exchangeable cations is meant those positively charged atoms or radicals which, because of their peculiar connection to a parent clay molecule or crystal, are capable of being replaced by other atoms or radicals, under a given set of conditions, by virtue of the phenomenon of cation exchange. The term radioelement as used in this specification and the appended claims includes elements which are naturally radioactive, such as bismuth, radium, etc., and elements which are made artificially radioactive by bombardment with particles, such as radionitrogen, radiobarium, etc. The phrase having a radioelement in its cation includes compounds in which the radioelement is the sole element of its cation, such as barium acetate containing radiobarium, etc., and compounds in which the radioelement is one of several elements of its positively charged radical or ion, such as ammonium chloride containing radionitrogen, etc.

Naturally occurring clay materials are found throughout the strata making up the crust of the earth. These clay materials, including shales, are composed essentially of extremely small crystalline particles of members of any one or more of a few groups of minerals known as the "clay minerals." These clay minerals are the essential constituents of clay materials and they are the most important single factor in determining the properties and characteristics of clay materials. Among the more common clay minerals may be listed kaolinite, and bentonite. Each of these basic types of clay minerals exhibits a tendency to give up certain positively charged atoms or radicals and in turn adsorb other positively charged atoms or radicals, such as sodium, calcium, etc., from among the elements and compounds existing in its environment. This ability to exchange one atom or radical for another is termed the cation exchange capacity of the clay mineral and is a characteristic value for each type of clay mineral. For example, a kaolin type clay will exhibit a low cation exchange capacity while a bentonite type clay has a high cation exchange capacity. It is significant to observe at this point that the cation exchange capacity of a clay mineral may vary from 1 to about 125 milliequivalents per 100 grams of clay. Thus it may be seen that the cation exchange capacity of a clay is a sensitive indicator of differences in the type of clay minerals associated with a given geological formation.

The exchangeable cations of a clay include positively charged atoms such as $Ca^+$, $Na^+$, $K^+$, etc., which may be replaced practically quantitatively by positively charged radicals such as $NH_4^+$, etc., and positively charged atoms such as $Ba^+$, etc. If a clay is contacted with a cation exchange material such as ammonium chloride, barium acetate, ammonium acetate, etc., the positively charged exchangeable atoms of the clay will be replaced by the positively charged atom or radical of the cation exchange material. The total amount of cations exchanged by the clay is a measure of the power of the clay to exchange cations with the cation exchange material and is expressed in terms of the cation exchange capacity as pointed out above.

From the above discussion it may be seen that the cation exchange capacity of a clay can be used to characterize a given clay containing formation and distinguish it from another formation containing another type of clay.

It is also to be observed that the cation exchange capacity of a clay is a fixed property of the clay and can be changed only if the clay is subjected to rather severe conditions, such as prolonged heating with strong acid or strong caustic solution or by prolonged grinding the clay. The exchange capacity of the clay will not be changed by placing the clay in contact with water or an aqueous salt solution. Therefore, invasion of a formation by a drilling fluid used in the completion of a well will not alter the cation exchange capacity of the clay, regardless of the type of drilling fluid employed. Likewise, invasion of one part of a formation by a brine solution will not interfere with a determination that the invaded and non-invaded portions of the formation are contemporaneous if the cation exchange capacity of the formation is utilized as an indicator.

My method of logging a bore hole takes advantage of this unchanging and sensitive character of the cation exchange caapcity of the clays which form a part of the formations traversed by the bore hole.

In accordance with a preferred embodiment of my invention, the cation exchange capacity of a clay material is measured by contacting the clay material with a solution of ammonium chloride, having radionitrogen as a constituent of its ammonium radical, flushing with water to remove excess solution, and thereafter measuring the gamma-radioactivity of the clay material. Cation exchange between the ammonium radical of the ammonium chloride and the exchangeable cations of the clay material takes place rapidly, and a contact time of about one hour is sufficient to bring about complete cation exchange. The increase in gamma-radioactivity of the clay material over its naturally occurring gamma-radioactivity is directly proportional to the amount of radioactive material adsorbed by the clay material in the process of cation exchange and, therefore, is an accurate measure of the cation exchange capacity of the clay material. The cation exchange material may also be percolated through the clay material until a sharp rise in the gamma-radioactivity of the effluent occurs, and the amount of ammonium radical adsorbed from the cation exchange material by the clay material is then measured. In producing a log of bore hole formations, the solution of ammonium chloride is contacted with the formations being tested, excess treating solution is flushed from the bore hole with water, and gamma-radioactivity is continuously recorded and correlated with depth along the length of the portion of the bore hole being investigated.

Cation exchange materials other than ammonium chloride, which materials have a radioelement in their positively charged exchangeable atom or radical, can be used. Suitable materials of this nature include: ammonium acetate having radionitrogen as a constituent, barium acetate having radiobarium as a constituent, etc.

The solution of cation exchange material utilized in carrying out my method is preferably a normal solution of the cation exchange material neutralized to pH 7. Although it is not necessary that the solution be a normal solution neutralized to pH 7, this type of solution is used in order to obtain reproduceable results in several wells, since the cation exchange capacity as measured at one pH is not necessarily the same as the capacity measured when using a solution exhibiting a different degree of acidity or alkalinity. However, it is apparent that a comparable degree of reproducibility can be attained with solutions of differing acidity or alkalinity provided the same type of solution is used in preparing each log.

Although the time of contact between the clay material and the cation exchange material is not critical, it is preferable that the time of contact be the same for each test made in order to obtain reproduceable results. Likewise, the method of flushing excess cation exchange material from the well is not critical since the basic reason for water flushing is to remove excess radioactive material which has not been absorbed by the clay in the formation.

Suitable procedures and instruments for measuring the gamma-radioactivity of the bore hole are well known in the art and form no part of my invention. For example, a Geiger counter may be lowered into the bore hole to effect such measurements. Although this instrument is not sufficiently sensitive for measurements of the naturally occurring gamma-radioactivity of bore hole formations, it is sufficiently sensitive for the purposes of my invention since the gamma-radioactivity measured in my method is much larger than the naturally occurring radioactivity and the differences to be measured are more pronounced. However, I prefer to use an ionization chamber of the type used in measuring the gamma-radioactivity of formations to produce the well known gamma-ray log. This instrument is normally a heavy cylinder, about 3 feet long, that contains two insulated electrodes and is filled with an inert gas under high pressure. Under normal conditions no current will flow through the gas when an electrical potential is set up between the electrodes, but when the chamber is exposed to gamma-radioactivity the gas becomes partly ionized and permits the flow of a very small current between the electrodes. The amount of this current varies directly as the ionization, which, in turn, is proportional to the intensity of the gamma rays acting upon the gas. The amount of current is amplified by suitable instruments at the surface and is continuously recorded.

Instruments for simultaneously correlating the depth of the instrument in the bore hole with the current being recorded are also well known in the art of gamma-ray logging and form no part of my invention.

For purposes of correlating strata from well to well no correction factor need be applied to my log to correct for the naturally occurring gamma-radioactivity of the strata since the total gamma-radioactivity for a given formation will be substantially duplicated for the same formation in a neighboring well. However, where the clay mineral component of a formation is to be typed, that is, identified as kaolinite, bentonite, etc., a log of the naturally occurring radioactivity of the bore hole formations should be made prior to treatment of the bore hole with my cation exchange material. This log can be prepared by the methods generally used by the industry in preparing such logs.

Having prepared a log of the gammaradioactivity of a bore hole as induced by cation exchange between my treating solution and the clay components of the formations forming the walls of the bore hole, valuable conclusions as to the nature and occurrence of the various formations can be drawn from a study of the log.

Clay deposited over a considerable area during a given period of sedimentation will have the same cation exchange capacity throughout the area and will produce the same characteristic variations on logs of neighboring bore holes prepared by my method of logging. Thus, by matching the characteristic variations of the various logs, the strata as it is found in the various bore holes may be correlated. As pointed out above, this will be true regardless of changes in environment occurring after the formation was laid down. Invasion of a part of a particular formation by water after the formation was laid down would change the chemical composition of the formation and change the character of the adsorbed cations of the clay components, but the cation exchange capacity would remain unchanged. Therefore, my log would recognize the invaded and non-invaded portions of the formation as contemporaneous. Likewise, invasion of a formation by certain types of drilling fluids will change the nature of the adsorbed cations, the specific resistivity, and the chemical composition of the formation, but the cation exchange capacity of the formation, and thus the gamma-radioactivity measured by my log, would not be affected.

It is also well known that sands containing montmorillonite clay will tend to split up into small particles and clog a formation when they are contacted with waters of certain types, while kaolinite clay will be virtually unaffected by contact with water. Therefore, if a secondary recovery program is contemplated it would be desirable to know the type of clay present in order to decide whether to use water as a secondary recovery driving-medium or some other type of medium. Since the various types of clays will show characteristic intensities on my log, the type of clay present can be determined by studying the log and the optimum secondary recovery method selected. The logging methods of the prior art yield no information of this type.

It is also known that portions of the clay materials of a formation are found in limestone and dolomite as an integral part of the formation and in such state are not exposed to the fluids of the well. When this type of formation is treated with an acid to increase its permeability, the formation structure is broken down exposing the clay to the well fluids. In their thus exposed state the clays will enter into cation exchange with water and other materials in their environment and certain types of clays will tend to swell and clog the formation thus negating the increased permeability brought about by the acid treatment. By determining the type of clay present in the formation by a study of my log, the operator may determine whether or not it is necessary to add an anti-swelling control agent to the acid treating solution prior to treatment.

It will be apparent that no attempt has been made to describe all the possible procedures and equipment which may be used in carrying out my invention. It will also be understood that my invention is not to be limited to a particular method of contacting the formations with cation exchange material nor to a particular method or instrument for measuring the gamma-radioactivity of the formations, but contemplates broadly any procedure by which a cation exchange material having a radioelement in its exchangeable cation is contacted with a clay material and the gamma-radioactivity of the clay material is measured.

The nature and objects of my invention having been described and illustrated above, what is claimed as new and useful and is desired to be secured by Letters Patent is:

1. A method of determining the cation exchange capacity of a clay material which comprises contacting said clay material with a cation exchange material capable of exchanging cations with said clay material and having a radioelement in its cation, and measuring the amount of cations adsorbed from said cation exchange material by said clay material by cation exchange.

2. A method of determining the cation exchange capacity of a clay material which comprises contacting said clay material with a neutral normal solution of a cation exchange material capable of exchanging cations with said clay material and having a radioelement in its cation, and measuring the amount of cations adsorbed from said cation exchange material by said clay material by cation exchange.

3. A method of determining the cation exchange capacity of a clay material which comprises contacting said clay material with a cation exchange material capable of exchanging cations with said clay material and having a radioelement in its cation, removing the portion of said cation exchange material which did not enter into the cation exchange reaction from said clay material, and measuring the gamma-radioactivity of said clay material.

4. A method of determining the cation exchange capacity of a clay material which comprises contacting said clay material with a neutral normal solution of a cation exchange material capable of exchanging cations with said clay material and having a radioelement in its cation, removing the portion of said cation exchange material which did not enter into the cation exchange reaction from said clay material, and measuring the gamma-radioactivity of said clay material.

5. A method of determining the cation exchange capacity of a clay material which comprises percolating a cation exchange material capable of exchanging cations with said clay material and having a radioelement in its cation through said clay material until a sudden increase in the gamma-radioactivity of the effluent cation exchange material occurs, and measuring the amount of cations adsorbed from said cation exchange material by said clay material by cation exchange.

6. A method of determining the cation exchange capacity of a clay material which comprises percolating a neutral normal solution of a cation exchange material capable of exchanging cations with said clay material and having a radioelement in its cation through said clay material until a sudden increase in the gamma-radioactivity of the effluent cation exchange material occurs, and measuring the amount of cations adsorbed from said cation exchange material by said clay material by cation exchange.

7. In a method of logging a bore hole the steps comprising contacting the strata forming the walls of said bore hole with a cation exchange material capable of exchanging cations with the naturally occurring clay components of said strata and having a radioelement in its cation, removing the portion of said cation exchange material which did not enter into the cation exchange reaction from said strata, and measuring the gamma-radioactivity of said strata.

8. In a method of logging a bore hole the steps comprising contacting the strata forming the walls of said bore hole with a neutral normal solution of a cation exchange material capable of exchanging cations with the naturally occurring clay components of said strata and having a radioelement in its cation, removing the portion of said cation exchange material which did not enter into the cation exchange reaction from said strata, and measuring the gamma-radioactivity of said strata.

9. A method of logging a bore hole which comprises contacting the strata forming the walls of said bore hole with a cation exchange material capable of exchanging cations with the naturally occurring clay components of said strata and having a radioelement in its cation, removing the portion of said cation exchange material which did not enter into the cation exchange reaction from said strata, measuring the gamma-radioactivity of said strata, and preparing a log correlating said gamma-radioactivity with depth.

10. A method of logging a bore hole which comprises contacting the strata forming the walls of said bore hole with a neutral normal solution of a cation exchange material capable of exchanging cations with the naturally occurring clay components of said strata and having a radioelement in its cation, removing the portion of said cation exchange material which did not enter into the cation exchange reaction from said strata, measuring the gamma-radioactivity of said strata, and preparing a log correlating said gamma-radioactivity with depth.

11. A method in accordance with claim 4 wherein said cation exchange material is barium acetate having radiobarium in its cation.

12. A method in accordance with claim 4 wherein said cation exchange material is ammonium chloride having radionitrogen in its cation.

13. A method in accordance with claim 4 wherein said cation exchange material is ammonium acetate having radionitrogen in its cation.

14. A method in accordance with claim 6 wherein said cation exchange material is barium acetate having radiobarium in its cation.

15. A method in accordance with claim 6 wherein said cation exchange material is ammonium chloride having radionitrogen in its cation.

16. A method in accordance with claim 6 wherein said cation exchange material is ammonium acetate having radionitrogen in its cation.

17. A method in accordance with claim 8 wherein said cation exchange material is barium acetate having radiobarium in its cation.

18. A method in accordance with claim 8 wherein said cation exchange material is ammonium chloride having radionitrogen in its cation.

19. A method in accordance with claim 8 wherein said cation exchange material is ammonium acetate having radionitrogen in its cation.

20. A method in accordance with claim 10 wherein said cation exchange material is barium acetate having radiobarium in its cation.

21. A method in accordance with claim 10 wherein said cation exchange material is ammonium chloride having radionitrogen in its cation.

22. A method in accordance with claim 10 wherein said cation exchange material is ammonium acetate having radionitrogen in its cation.

References Cited in the file of this patent

UNITED STATES PATENTS

| Number | Name | Date |
| --- | --- | --- |
| 2,390,931 | Fearon | Dec. 11, 1945 |
| 2,520,058 | Reichertz | Aug. 22, 1950 |
| 2,544,412 | Bird | Mar. 6, 1951 |